Patented Nov. 15, 1949

2,488,186

UNITED STATES PATENT OFFICE 2,488,186

PROCESS FOR PREPARING PHENOLIC MATERIAL FROM A LIGNIN SUBSTANCE

Donald H. Grangaard, Appleton, Wis., assignor, by mesne assignments, to Sulphite Products Corporation, Appleton, Wis., a corporation of Wisconsin No Drawing. Application August 8, 1947, Serial No. 767,659

15 Claims. (Cl. 260—621)

The present invention relates to the production of phenolic compounds from lignin or lignin substances. More specifically, the present invention is directed to improved processes of producing catechol from lignin substances present in waste by-products from pulping processes.

Many attempts have been made in the past to recover useful products from lignin-containing wastes resulting from the production of chemical pulp used in the manufacture of paper. Most of these prior attempts have resulted in the recovery of relatively low yields of desired products as well as to the use of involved processes which, for the most part, have proven impractical in commercial operations.

The principal object of the present invention is to provide improved processes for preparing phenolic compounds from lignin substances.

Another object of the present invention is to provide commercially practical processes for preparing catechol from lignin-containing paper mill wastes.

Other objects of the present invention will be apparent as the detailed description proceeds hereinafter.

I have discovered that valuable phenolic compounds, particularly catechol, may be readily produced in desired yields from lignin substances, including the lignin-containing paper mill wastes referred to above, by a relatively simple, commercially practical process. This process comprises generally the treatment of the lignin substances with a stable amine hydrohalide at temperatures of at least 200° C., and preferably within the range of 200°–300° C., and maintaining the reaction mixture at this temperature for several hours, e. g. 2–3 hours, until the lignin has been degraded into the desired phenolic compounds.

The following examples will serve to illustrate the present invention. The "parts" referred to in the examples are parts by weight.

Example I

About 500 parts of aniline hydrochloride are melted, as over an oil bath, and 100 parts of acid precipitated lignin (derived from sulfite waste liquor and substantially free from carbohydrates and inorganic sulfur compounds) are stirred in slowly. The temperature of the mixture is raised to about 225°–230° C. and maintained for about 2 to 3 hours with constant stirring under reflux and with hydrochloric acid gas bubbling through the melt. This completes the reaction. The mixture is next allowed to cool to 160°–170° C. and 200 parts of water are added a little at a time. The resulting mixture is then cooled to room temperature and rendered definitely acid with hydrochloric acid. The whole is then extracted with a water immiscible phenolic solvent such as ether and the extract dried over anhydrous sodium sulfate, and the dried extract distilled to remove the ether. The resulting residue sublimes in vacuo to yield 6 or 7 parts of catechol and an approximately equal amount of a residue having phenolic characteristics of the protocatechuic acid type.

Dilution of the solution which was extracted with ether results in a precipitate of from 40 to 60 parts of degraded lignin. It is similar in appearance to the original lignin and about equally insoluble in acids, but it differs from the original lignin in being insoluble in alkali even in hot and concentrated alkaline solutions.

Example II

Mix 100 parts of acid precipitated lignin and 200 parts of tri-n-butylamine, pass into this mixture dry hydrogen chloride gas with stirring under reflux, and heat gradually to about 225° C. during a 3-hour period and maintain that temperature for about 2 hours. Treatment of the reaction mixture as in Example I gives catechol and a phenolic residue of the same type as in Example I.

Example III

Mix 100 parts of acid precipitated lignin with 200 parts of dimethyl aniline, pass into this mixture dry hydrogen chloride gas with stirring under reflux, and raise the temperature gradually over a 3-hour period to 225° C., and maintain that temperature for about 2 hours. After working up as in Example I, the resulting residue gives 3.5 parts of catechol and 6.2 parts of a phenolic residue having the characteristics of the corresponding residue of Example I.

Example IV

About 25 parts of acid precipitated lignin are added to 94 parts of aniline and a stream of hydrogen bromide is passed through the mixture with constant stirring. The addition of the hydrogen bromide results in evolution of heat and the rate of addition is controlled to keep the temperature substantially below the boiling point of aniline until approximately 81 parts of hydrogen bromide has been absorbed. Then the reaction mixture is further heated to about 225° C. and kept at that temperature for about 2½ hours, then the mixture is allowed to cool to 170°–180° C. and 150 parts of water added a little at a time. The entire mixture is allowed to cool to room temperature, acidified and extracted with ether and processed as in Example I.

*Example V*

About 350 parts of o-amino-diphenyl hydrochloride are heated to 230° C. and 50 parts of acid precipitated lignin are slowly added. Then heating is continued to raise the temperature to about 295°–297° C. and this temperature maintained for about 2½ hours. The reaction mixture is then allowed to cool to room temperature. This mixture, which is in the form of a black syrupy solution, is worked up by adding about 290 parts of concentrated HCl and allowing the mixture to solidify. Then the solid product is suspended in water and treated with 100 parts of 10% caustic soda. This mixture is extracted with ether and the ether extract discarded. The mixture is steam distilled to remove any remaining traces of o-amino-diphenyl. The mixture is then strongly acidified with hydrochloric acid and extracted with ether. This ether extract, dried over anhydrous sodium sulfate and treated as in Example I, gives catechol and a phenolic residue.

*Example VI*

About 250 parts of pyridine and 25 parts of acid precipitated lignin are mixed and dry hydrogen chloride gas passed through the mixture while the temperature is raised gradually to 220°–222° C. and maintained at this temperature for about four hours. After cooling to about 160° C., addition of 150 parts of water, cooling to room temperature and acidification, ether extraction as in Example I gives a yield of 3.4 parts of ether soluble phenolic materials.

The reaction of any of the foregoing examples may be carried out in any one of the four ways: first, by raising a mixture of the amine hydrohalide and the lignin substance to the desired reaction temperature and passing in hydrohalide gas; second, by raising the amine and the lignin substance to the desired reaction temperature and passing in hydrohalide gas; third, by adding concentrated aqueous hydrohalide acid to a mixture of the amine and the lignin substance, and raising the temperature first to eliminate water and then to the desired reaction temperature; and fourth, by raising a mixture of the amine hydrohalide and the lignin substance to the desired reaction temperature. In all of these procedures a solvent mass is employed and the use of an excess of amine hydrohalide to effect the reaction and provide the solvent medium is normally the most convenient practice. In all of these procedures it is also desirable that the amine present remain completely in the form of the hydrohalides, and to provide for this it is preferred to introduce excess hydrohalide gas into the reaction mixture as illustrated in the first an second procedures given above. The second procedure is more convenient than the first when the amine forms a hydrohalide with a melting point higher than the temperature desired for the reaction. Even with compounds of lower melting point the second procedure has an advantage in that the heat liberated by the formation of the hydrohalide assists in temperature control at the outset of the process. The main reaction is endothermic so that the heat needs to be supplied to maintain the mixture at the desired temperature throughout the progess of the main reaction.

In the above illustrative processes, the acidification step is employed after completion of the reaction to facilitate the recovery of the phenolic compounds from the amine reaction mixture, e. g. to prevent the extract from becoming contaminated with free amine. The use of additional acid is unnecessary if the reaction mixture is already acidified, i. e. the amine is present as its acid addition salt. Also, if free amine is present acidification may be omitted and the phenolic compounds recovered by various procedures as, for example, by fractional distillation of the extract.

With respect to lignin, the process of the present invention is applicable to the treatment of lignin substances of all sorts such as: plain sulfite waste liquor; the black liquors from the soda (NaOH), or Kraft (NaOH—Na₂S) processes; the liquors from neutral or alkaline sulfite (Na₂SO₃) processes; the various sulfonated lignin residues including calcium lignosulfonate; lignin purified by removal of carbohydrates through conversion to an acid-precipitable form; lignin residues remaining after treatment of lignin-containing materials with strong mineral acids and leaching of carbohydrates; and ordinary wood flour. Ordinary waste sulfite cooking liquor, such as is obtained from an acid calcium bisulfite or an acid calcium-magnesium bisulfite pulping operation, may be reduced to dryness, and the dry material containing varying percentages of lignin, usually between 40% and 60%, gives a high yield of the desired phenolic products. Various grades of more or less purified lignin are available on the market and are susceptible to treatment by the process herein disclosed, but excellent results can be obtained with the cheaper crude lignin material. The acid precipitated lignin employed in the examples was prepared in accordance with standard practices by first pressure cooking waste sulfite liquor solids with caustic soda and then precipitating the lignin from the resulting solution by addition of acid. This lignin, which is a more or less desulfonated lignin, gives particularly high yields of the desired phenolic compounds.

With respect to the amine hydrohalide, various alkyl, aralkyl, and aryl amine hydrohalides may be employed, although for satisfactory operations the amine hydrohalide should be stable under the conditions of the reaction, e. g. at temperatures between 200°–300° C. The use of weakly basic amines which form hydrohalide salts that are not stable, e. g. separate into the free amine and hydrohalide, at the reaction temperature, i. e. at least above 200° C., are not practical in the present invention. In addition to the amines employed in the illustrative examples, other phenylamines, phenyl-lower alkyl amine combinations and lower alkyl amines including the alkanol amines such as ethanolamine, 2-amino-1-propanol, etc., may be employed. Alpha naphthylamine may also be employed as well as the pyridine of Example VI which illustrates the use of cyclic type of amine compounds. The process of the present invention works smoothly with a wide variety of amine hydrohalides including hydrohalides with relatively high melting points. Preferably, however, the amine hydrohalides employed in the present invention should also be characterized by melting points below 300° C.

The preferred hydrohalide for use in the present invention is HCl although other hydrohalides such as HBr may be used as illustrated by Example IV. The hydrochlorides of the lower alkyl amines and the phenyl amines including aniline and phenyl-lower alkyl amines, are ordinarily preferred.

While the structure of lignin is extremely complex and is not known in all detail, my investigations indicate that in the process of the present invention there is scission of carbon to carbon bonds. As far as I am aware this has not been accomplished heretofore with the reagents employed in the present invention. It will be understood in this connection that the process of the present invention is not directed to solubilizing lignin but rather to the production and recovery of phenolic compounds by the decomposition or degradation of lignin under the reaction conditions specified above. Of these conditions the use of a water-free or non-aqueous reaction mixture is necessary in order to obtain the high temperatures needed to decompose or degrade the lignin to the desired phenolic compounds.

The present application is a continuation-in-part of my co-pending application Serial No. 537,981, filed May 29, 1944, now abandoned.

I claim:

1. The process of preparing phenolic compounds containing a substantial proportion of catechol which comprises subjecting a lignin substance to a stable amine hydrohalide reaction mixture at a temperature of about 200°–300° C., maintaining said temperature for at least about two hours and recovering the phenolic compounds from the reaction mixture.

2. The process of preparing phenolic compounds which comprises subjecting a lignin substance to a stable amine hydrohalide reaction mixture at a temperature of about 200°–300° C. for at least about two hours, acidifying the reaction mixture and recovering phenolic compounds from the acidified mixture.

3. The process of preparing phenolic compounds which comprises subjecting a lignin substance to a stable amine hydrohalide reaction mixture at a temperature of about 200°–300° C. for about two to three hours, acidifying the reaction mixture, extracting the acidified mixture with a water-immiscible phenolic solvent and recovering phenolic compounds from the extract.

4. The process of preparing phenolic compounds containing a substantial proportion of catechol which comprises degrading a lignin substance in a stable amine hydrochloride reaction mixture at a temperature of about 200°–300° C. for at least about two hours, acidifying the reaction mixture and recovering the phenolic compounds from the acidified mixture.

5. The process of preparing phenolic compounds containing a substantial proportion of catechol which comprises degrading a lignin substance in an aniline hydrochloride reaction mixture at a temperature of about 200°–300° C. for at least about two hours and recovering the phenolic compounds from the reaction mixture.

6. The process of preparing phenolic compounds containing a substantial proportion of catechol which comprises degrading a lignin substance in a dimethyl aniline hydrochloride reaction mixture at a temperature of about 200°–300° C. for at least about two hours and recovering the phenolic compounds from the reaction mixture.

7. The process of preparing phenolic compounds containing a substantial proportion of catechol which comprises degrading a lignin substance in a tri-n-butylamine hydrochloride reaction mixture at a temperature of about 200°–300° C. for at least about two hours and recovering the phenolic compounds from the reaction mixture.

8. The process of preparing phenolic compounds which comprises subjecting a lignin substance to a stable amine hydrohalide reaction mixture for at least about two hours at a temperature of about 200°–300° C., while passing into said mixture hydrogen halide gas, and recovering the phenolic compounds from the acidified reaction mixture.

9. The process of preparing phenolic compounds which comprises subjecting a lignin substance to a stable amine hydrochloride reaction mixture for at least about two hours at a temperature of about 200°–300° C. while passing into said mixture hydrogen chloride gas, and recovering the phenolic compounds from the acidified reaction mixture.

10. The process of preparing phenolic compounds which comprises mixing an amine with a lignin substance and heating the resulting reaction mixture for at least about two hours at a temperature of about 200°–300° C. while passing into said mixture hydrogen halide gas, said amine being selected from the class of amines which form stable hydrohalide salts at the reaction temperature, and recovering the phenolic compounds from the acidified reaction mixture.

11. The process of preparing phenolic compounds which comprises mixing an amine with a lignin substance and heating the resulting reaction mixture for at least about two hours at a temperature of about 200°–300° C. while passing into said mixture hydrogen chloride gas, said amine being selected from the class of amines which form stable hydrochloride salts at the reaction temperature, and recovering the phenolic compounds from the acidified reaction mixture.

12. In the process of producing catechol from lignin-containing paper mill wastes, the improvement which consists in subjecting the lignin substance to a stable amine hydrohalide reaction mixture at a temperature of about 200°–300° C. for at least about two hours, acidifying the reaction mixture and recovering the catechol from the acidified mixture.

13. In the process of producing catechol from lignin-containing paper mill wastes, the improvement which consists in subjecting the lignin substance to a stable amine hydrochloride reaction mixture at a temperature of about 200°–300° C. for at least about two hours, acidifying the reaction mixture and recovering the catechol from the acidified mixture.

14. The process of preparing phenolic compounds containing a substantial proportion of catechol which comprises subjecting a lignin substance to a stable amine hydrochloride reaction mixture at a temperature of about 200°–300° C., maintaining said temperature for at least about two hours and recovering the phenolic compounds from the reaction mixture.

15. The process of preparing phenolic compounds which comprises subjecting a lignin substance to a stable amine hydrochloride reaction mixture at a temperature of about 200°–300° C. for about two to three hours, acidifying the reaction mixture, extracting the acidified mixture with a water immiscible phenolic solvent and recovering phenolic compounds from the extract.

DONALD H. GRANGAARD.

REFERENCES CITED

The following references are of record in the file of this patent:

UNITED STATES PATENTS

| Number | Name | Date |
|---|---|---|
| 2,192,030 | Burmeister | Feb. 27, 1940 |
| 2,405,451 | Salversen et al. | Aug. 6, 1946 |

FOREIGN PATENTS

| Number | Country | Date |
|---|---|---|
| 328,729 | Germany | Nov. 5, 1920 |

OTHER REFERENCES

Hillmer Cellulosechemie, vol. VI, No. 11, 169–188 (1925).